(12) United States Patent
De Frenne

(10) Patent No.: US 6,213,263 B1
(45) Date of Patent: Apr. 10, 2001

(54) OIL DAMPER SYSTEM

(75) Inventor: Pierre De Frenne, Montauban (FR)

(73) Assignee: Donerre Amortisseur, Montauban (FR)

( * ) Notice: Subject to any disclaimer, the term of this patent is extended or adjusted under 35 U.S.C. 154(b) by 0 days.

(21) Appl. No.: 09/230,377

(22) PCT Filed: Jul. 24, 1997

(86) PCT No.: PCT/FR97/01386

§ 371 Date: May 19, 1999

§ 102(e) Date: May 19, 1999

(87) PCT Pub. No.: WO98/03361

PCT Pub. Date: Jan. 29, 1998

(30) Foreign Application Priority Data

Jul. 24, 1996 (FR) .................................................. 96 09329

(51) Int. Cl.⁷ .................................................. B60G 17/08
(52) U.S. Cl. .......................................... 188/318; 267/118
(58) Field of Search .............................. 188/282.2, 282.7, 188/282.8, 282.9, 285, 314, 318, 322.21; 267/64.16, 64.28, 118

(56) References Cited

U.S. PATENT DOCUMENTS 4,936,424 * 6/1990 Costa .................................. 188/314

FOREIGN PATENT DOCUMENTS

| 0 237 085 | 9/1987 | (EP) . |
| 0 542 282 | 5/1993 | (EP) . |
| 2 084 289 | 4/1982 | (GB) . |
| 94 12360 | 6/1994 | (WO) . |

* cited by examiner

Primary Examiner—Christopher P. Schwartz
(74) Attorney, Agent, or Firm—Nixon & Vanderhye

(57) ABSTRACT

The oil shock absorber system includes a piston and cylinder arrangement for driving oil from the cylinder to a reservoir. The reservoir includes a reserve chamber and a chamber intermediate the cylinder and the reserve chamber. A flow path including three different orifices communicate between the intermediate and reserve chambers, with two orifices having adjustable non-return valves. One valve constitutes an adjustable hydraulic brake evacuating oil from the intermediate chamber into the reserve chamber only when the cylinder pressure exceeds a predetermined pressure. The second valve is adjustable for a range of piston displacement speeds that lies between a first low speed and hydraulic brake speeds.

8 Claims, 4 Drawing Sheets

OIL DAMPER SYSTEM

BACKGROUND OF THE INVENTION

This invention relates to an oil shock absorber system for motorcycles or automobiles and in particular for vehicles that are used either for racing or for all-terrain driving.

An oil shock absorber that comprises a mobile piston in a cylinder which, during its compression travel, displaces the oil that is contained in a chamber toward, on the one hand, a reservoir and, on the other, a second chamber that is located on the other side of the piston, is known from U.S. patent application Ser. No. 4,958,706. The path of the oil toward the second chamber that is located on the other side of the piston runs through valves for adjusting the resilience characteristics of the shock absorber. The pressure of the oil that is driven into the reservoir is balanced by a pocket that holds a pressurized gas and that plays, as it were, a role equivalent to that of the spring in the spring shock absorbers of the prior art. Access to the chamber of the reservoir is limited by, on the one hand, a system that can be adjusted by a screw for adjusting the compression rate, and, on the other, a valve for protection against excessive pressure that is set to withstand a maximum pressure of about 140 $Kg/cm^2$ (2000 psi).

A shock absorber system that comprises a cylinder in which a mobile piston delimits two working volumes is also known from International Patent Application WO 94 12360. Each volume is connected, via a pipe, to an intermediate volume. The two intermediate volumes each communicate by three orifices with the same control chamber. The three orifices respectively comprise a valve for regulating the flow of oil from the intermediate volume to the control chamber, an adjustable nonreturn valve that constitutes a hydraulic brake, and a valve that allows a permanent passage from the control chamber to the intermediate volume. This relatively complex system makes it possible to adjust the characteristics of compression and of stress relief of a shock absorber independently, but it does not allow optimum adjustment of the shock absorber for operations in a range of displacement speeds of the piston that lies between low speeds and hydraulic brake speeds.

This invention relates to an oil reservoir that can be used with such a shock absorber or with other simpler or more complex shock absorber types. Actually, it has been noted that in these shock absorber systems, an elastic element that generally consists of a rubber ring is always provided on the shock absorber, between, on the one hand, ring (11) that is placed at the end of rod (10) of the piston that is adjacent to attachment ring (12) on the frame of the vehicle and, on the other hand, lower outside surface (151) of cylindrical body (15) that constitutes the compression chamber which forms the shock absorber stop that is encountered under extreme operating conditions. Actually, since the shock absorber is protected against excessive pressure, the valve of the reservoir is likely to open when the vehicle falls back after a major bounce, and, in this case, the only protection for the shock absorber is the elastic bearing that is located between cylinder (15) and ring (11).

The elastic bearing has the drawback of generating uncontrollable bouncing phenomena for the driver which sometimes bring the vehicle to tip violently to the front.

SUMMARY OF THE INVENTION

A first object of the invention is to propose a shock absorber system that makes it possible to eliminate these drawbacks and to improve the response characteristics of the shock absorber during compression phases while retaining the advantages and characteristics of oil shock absorbers.

This object is achieved by the fact that the oil shock absorber system that consists of a piston that is mounted at the end of a movable rod that moves in a cylindrical hollow body by driving the oil that is between the piston and the bottom of the hollow body of the shock absorber toward a deformable reserve chamber, to the outside of which a pressurized gas is applied, whereby the oil that is evacuated to the reserve chamber via at least two different orifices, depending on the displacement speeds of the piston, is characterized in that the path of the oil runs through an intermediate chamber of a given volume and the orifices are located between the reserve chamber and the intermediate chamber, whereby at least one of the orifices or the first orifice is blocked by an adjustable nonreturn valve that constitutes an adjustable hydraulic brake so as to allow the oil to evacuate only when the pressure that is exerted by the piston on the oil is such that it exceeds the vehicle's most extreme anticipated operating conditions, and in that a second adjustable nonreturn valve blocks a second orifice that is located between the intermediate chamber and the reserve chamber, whereby the second adjustable nonreturn valve is adjusted for a range of displacement speeds of the piston that lies between low speeds and hydraulic brake speeds.

According to another particular feature, a third orifice that is provided with an adjustable constriction makes it possible at low speeds to evacuate oil from the intermediate chamber to the reserve chamber.

According to another particular feature, the first and second valves comprise a screw element that is extended by a notched rod uniformly over a given height of its periphery and that supports on the end of the rod means for attaching a holding cap, whereby a sealing washer (354) and an elastic means are held between the holding cap and the notched part, and the elastic means presses the sealing washer with a specific force on the seat of the respective orifice that is associated with the valve.

According to another particular feature, the notched part works with a ball on which elastic means act to constitute an adjusting catch.

According to another particular feature, the intermediate chamber consists of an annular groove that is formed in a cylindrical ring that is intended to close the open end of the reservoir, whereby the cylindrical ring is provided with holes that run through the ring and the annular groove, whereby the holes comprise, on the outside of the reservoir, threading for the screw element and means that make it possible to ensure sealing between the screw body and the hole.

According to another particular feature, the elastic means that press the sealing washer against the seat of the hole consist of a stack of several beleville washers that are mounted two by two opposite one another.

According to another particular feature, the elastic means for the high-speed screw consist of a stack of beleville washers with a thickness of between 0.20 mm and 0.45 mm.

According to another particular feature, the elastic means for the hydraulic stop screw consist of a stack of beleville washers with a thickness of between 0.45 mm and 1 mm, with a greater thickness for the washers of the stop screw than that of the washers of the high-speed screw.

BRIEF DESCRIPTION OF THE DRAWING FIGURES

Other particular features and advantages of this invention will become clearer from reading the description below, which is given with reference to the accompanying drawings, where:

DETAILED DESCRIPTION OF THE INVENTION

Figure 1:
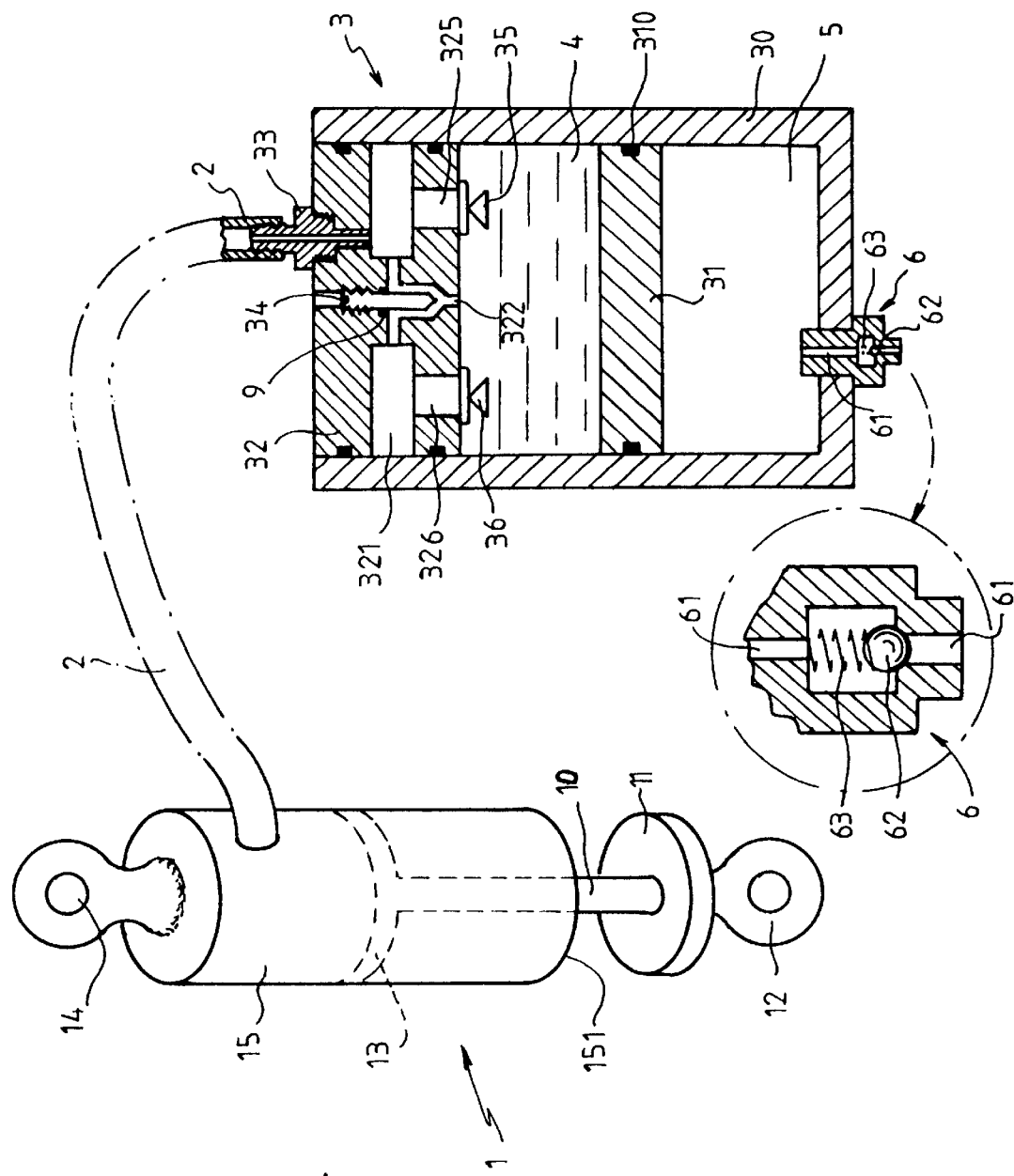
FIG. 1 depicts a diagrammatic view of the principle of the invention.

The invention will now be described with FIGS. 1 to 3.

The shock absorber system consists of a hollow cylinder (15) in which moves a piston (13) that is located at the end of a rod (10) whose other end has an eyelet (12) for mounting on the vehicle and, close to the eyelet, a thrust washer (11). The end of cylinder (15) that is opposite eyelet (12) also comprises an eyelet (14) for mounting on the vehicle. When the vehicle moves, the rod will be acted on by compression or extension and, during the compression phases, the fluid that is between piston (13) and the bottom of chamber (15) that is close to eyelet (14) of cylinder (15) will be driven via pipe (2) toward a reservoir (3). The reservoir (3) comprises a reserve chamber (4) that is delimited by a cylindrical piston (31) that moves freely in the reservoir under the action of the pressures of fluid (4) and a gas (5) that is introduced into the zone that is between the other face of piston (31) and the bottom of the reservoir. The fluid is introduced in a known way via a filling nonreturn valve (6). Sealing between the gas and the fluid is ensured by an annular seal (310) that is placed in a peripheral groove of piston (31). Pipe (2) is connected to the reservoir by a joining piece (33), one end of which empties into an intermediate chamber (321) that is formed in a ring (32). The intermediate chamber (321) leads into oil reserve chamber (4) via three orifices (325, 322, 326), two of which are blocked by a nonreturn valve and the third (322), which is provided with an adjustable constriction that can be open to a greater or lesser extent. For example, a float-needle screw (34) is placed in the threaded hole of ring (32). Float needle (34) comes to seal more or less tapered orifice (322). The float needle screw (34) comprises a seal (9) between annular chamber (321) and the outside part of ring (32). The float needle screw can be replaced by any other equivalent means such as, for example, a calibrated slot.

Figure 2A:
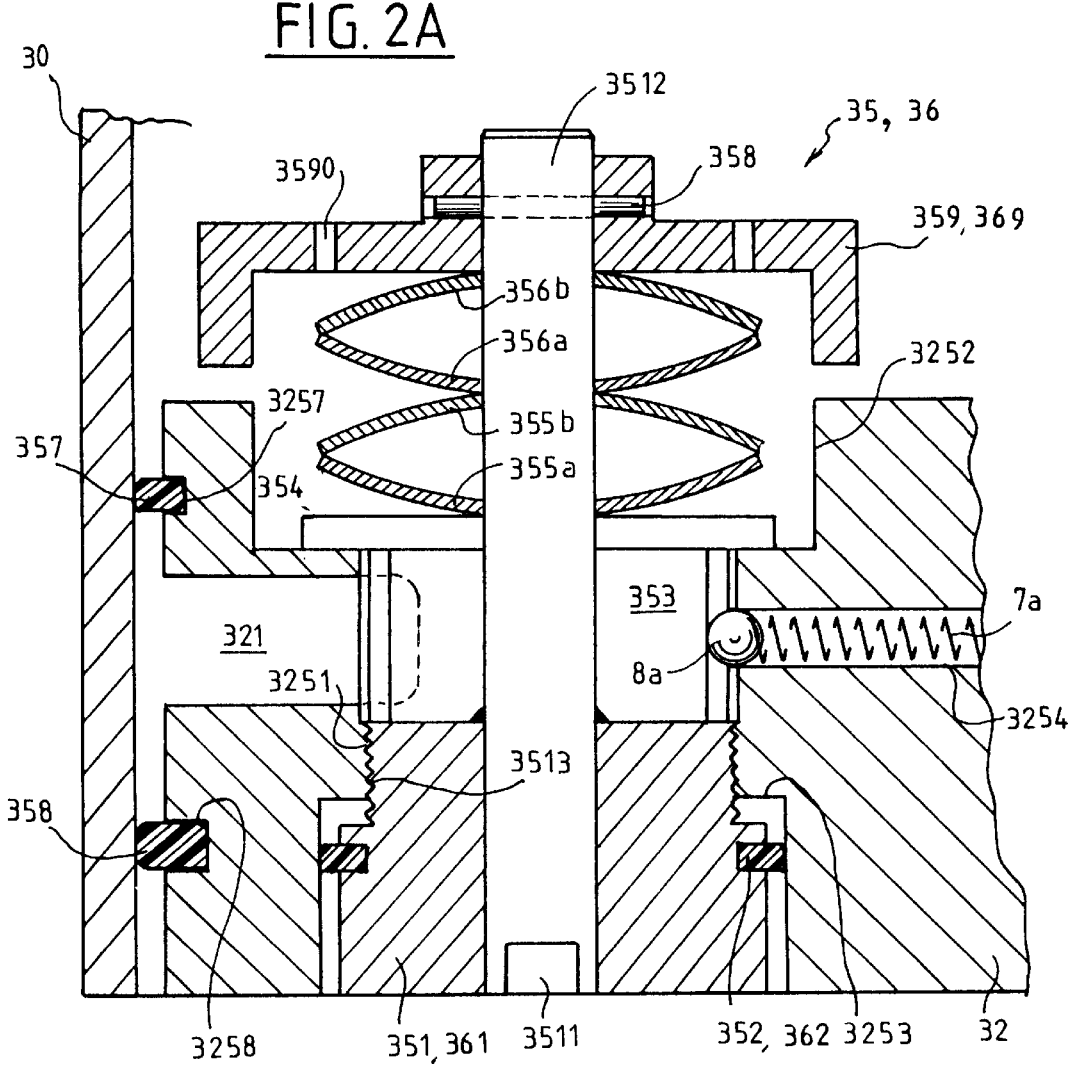
FIG. 2A depicts a detail view and a partial cutaway view of adjustable valves.
Figure 2B:
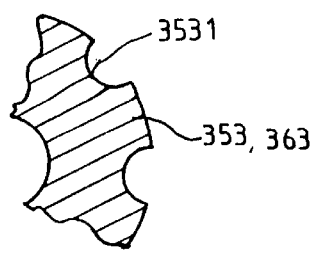
FIG. 2B depicts a top view of the notched portion of the screw.
Figure 2D:
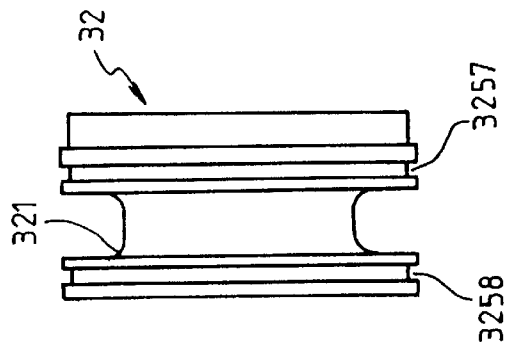
FIG. 2D depicts a side view of the ring.
Figure 2E:
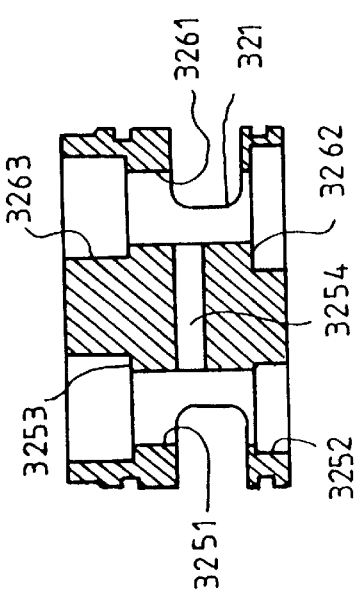
FIG. 2E depicts a cutaway view along the line that runs through the two axes of symmetry of the two adjustable valves.
Figure 2C:
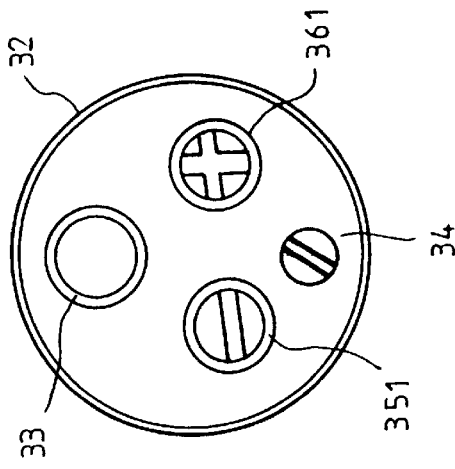
FIG. 2C depicts a bottom view of the closing ring of the reservoir.

Communication between intermediate chamber (321) and reserve chamber (4) is prevented by at least one nonreturn valve, and, in the variant that is depicted in FIG. 1, by two adjustable nonreturn valves (35, 36), as will be seen below. Each of the nonreturn valves is made in a way that is identical to that depicted in FIG. 2A. The valve is formed by a washer (354) that presses on the seat that is delimited by cylindrical hole (3252) which has a diameter that is larger than hole (3251) for forming the seat of the valve. Hole (3251) comprises a threaded part at its end that faces the seat. The hole (3251) empties to the outside of ring (32) via a hole with a larger diameter, forming a shoulder (3253) with the threaded part. Likewise, valve (36) will comprise a ring (364), whereby hole (3262) forms the seat with threaded hole (3261) and shoulder (3263). Each sealing washer (354, 364) is mounted on a rod (3512, or 3612) that comprises at its end a hole in which runs a pin (358, or 368) that makes the rod integral with a cap (359, or 369) whose section is substantially U-shaped and comprises, in the central part of the U, holes (3590) for the passage of the oil. Beleville washers (355a, 355b, 356a, 356b) that are mounted two by two opposite one another (365a, 365b; 366a, 366b) are placed under cap (359, 369). For valve (36), there is also a given number of beleville washers that are mounted two by two opposite one another to constitute an elastic means that presses with a given force sealing washer (354, or 364) against, on the one hand, the seat of the hole and, on the other, a notched ring (353, or 363) that is integral with respective rod (3512, 3612) of each screw of each valve (35, 36). Each notched ring (353, 363) comprises, distributed uniformly over its periphery, slots (3531, 3631) that constitute housings for a ball (8a, or 8b) which is acted on by a spring (7a, or 7b) in such a way that ball (8a, or 8b) lodges in respective slot (3531, 3631) of the notched ring that faces it. The notched ring is made integral with the rod on which it is mounted by suitable means, such as, for example, brazing. The rod is extended from the side of the head of screw (351, or 361) by a threaded part (3513, or 3613), and the screw head comprises a widening in diameter in which is formed a groove that makes it possible to install a seal (352, or 362). Each of the screw beads comprises a groove (3511) for first screw (35) and a cross groove (3611) for second screw (36), as can be seen in FIG. 2C. With a tool, these grooves make it possible to unscrew notch by notch each of the screws that constitute an adjusting valve, which has the effect of compressing the beleville washers between washer (354 or 364) and respective cap (359, 369). This makes it possible to determine the compression force beyond which the valve will open. Sealing between ring (32) and the cylindrical wall of reservoir (30) is achieved by two toric seals (358, 357) that are each placed in a peripheral groove (3258, 3257) that is formed on both sides of the annular groove that constitutes intermediate chamber (321).

Figure 3:
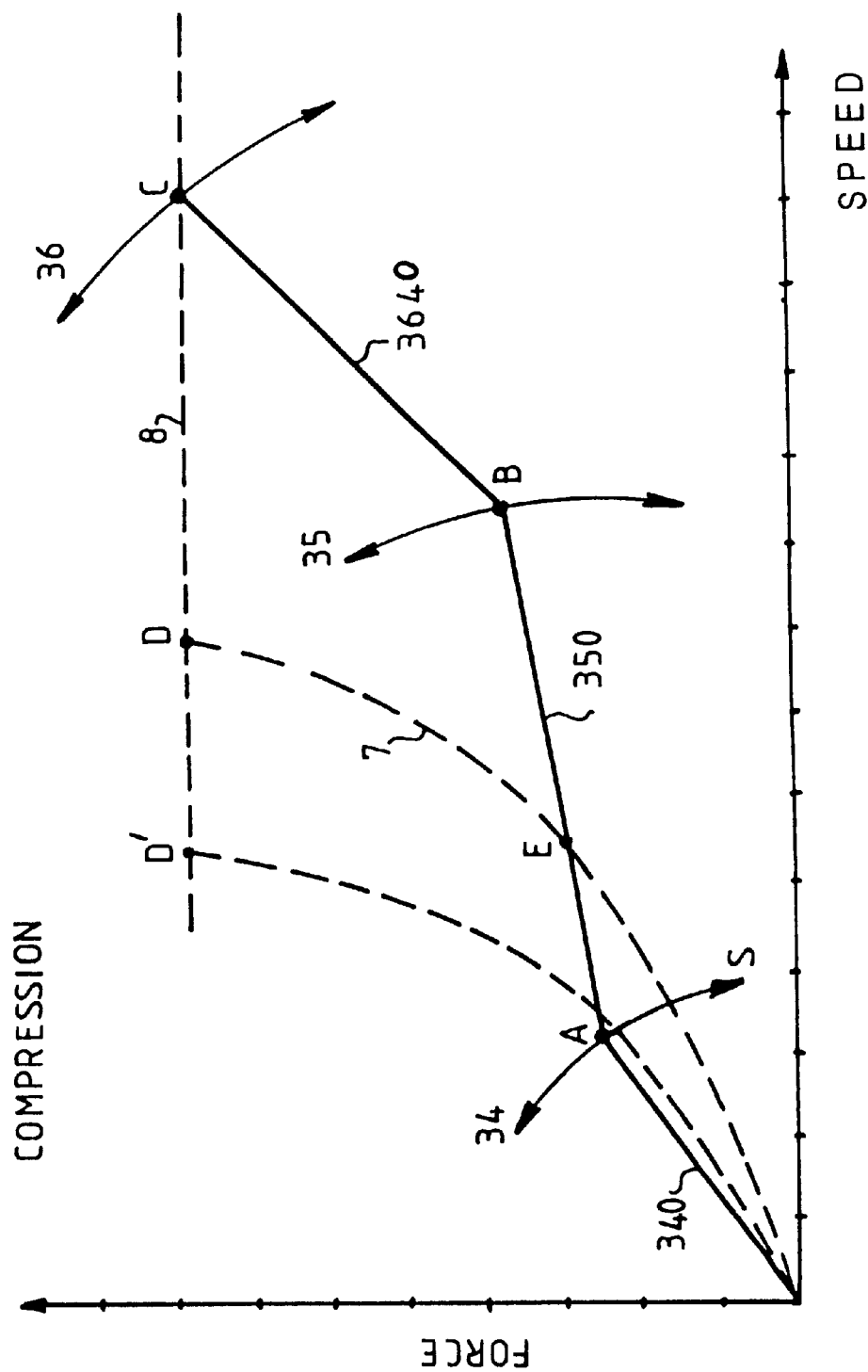
FIG. 3 depicts the curve that expresses the force response characteristics depending on the compression speed.

As can be seen in FIG. 3, the diagram that depicts the variation of the characteristics of the shock absorber as a function of compression speed and compression force will vary based on the adjustment that is made to each of the screws. Then, when float-needle screw (34) that constitutes the so-called low-speed screw is adjusted, point A of the curve moves up or down, as indicated by arrows (34) of FIG. 3. The more orifice (322) is constricted by the float needle of the screw, the faster this orifice will become saturated, and flow will have to take place via the high-speed valve. Consequently, tightening screw (34) causes curve (340) to move in the direction of arrow S. When orifice (322) saturates, the pressure in the intermediate chamber increases and reaches the resistance force that is constituted by beleville washers (355, 356) of first valve (35), which detaches sealing washer (354) from its seat, thus making it possible for the fluid to flow from intermediate chamber (321) toward reserve chamber (4) via the annular space that is available between notched crown (353) and hole (3251). When the displacement speed of the piston or the pressure of the fluid increases greatly, first adjustable valve (35) will saturate, and the pressure will continue to increase by pushing against second valve (36) that constitutes the hydraulic stop. The second valve (36) comprises beleville washers with a larger thickness, and screw (361) is adjusted in such a way that washer (364) rests on its seat until the compression speed and compression force have reached point C of curve (3640). In the working zone, the shock absorber therefore retains a response characteristic that is a function of pressure and speed, which thus constitutes a hydraulic brake. When pressure and speed exceed point C of the curve, valve (364) opens, and the oil flows toward the reservoir via the valve. The thickness of the washers can be adapted based on the valve and the application. Also on motorcycle or 4×4 automobile shock absorbers, it is possible to mount washers with a thickness of 0.45 mm for the high-speed screw and 0.65 mm for the stop screw or hydraulic brake. In other applications such as an all-terrain vehicle or VTC, thicknesses of, for example, 0.20 mm will be used for the high-speed screw and of 0.45 mm for the stop screw or hydraulic brake. These thicknesses are determined by one skilled in the art based on the loads that are tolerated by each shock absorber and the type of use and the desired compression response curve.

The compression force curve that is based on the compression speed or the displacement of the cylinder rod in the case of a device that corresponds to U.S. Pat. No. 4,958,706 is depicted in FIG. 3, also in dotted lines. It is seen that the part of the curve in dotted lines (7) corresponds to the possibilities for adjusting screw (54) and, based on the adjustment of the screw, point D of the curve in dotted lines moves on horizontal line (8). If it is desired for the shock absorber to have, according to this U.S. patent, operating characteristics that are approximately normal, movement will take place between the curves that come to points D and D' depending on the adjustment of screw (54). The bearing that is indicated by the horizontal line in dotted lines (8) corresponds to the maximum pressure that can be tolerated by valve (64) of U.S. Pat. No. 4,958,706. It was deliberately reconsidered that valve (64) be adjusted for the same value as that of point C. It will be easily understood, however, as was explained above, that point C of the hydraulic brake screw can be adjusted to a higher or lower value. Thus, the shock absorber of the invention offers the advantage of being able to adapt to forces that are tolerated by the shock absorber according to its use. In fact, when the shock absorber is used on a motorcycle or an automobile, the maximum compression force at which the hydraulic brake effect should be able to be exerted will vary depending on the type of vehicle.

A first advantage of the invention is therefore to make it possible with a shock absorber of the same type to adapt it both to a motorcycle and to an automobile, as well as to adapt it to road conditions that the vehicle will encounter by moving point C up or down.

Another advantage consists in the fact that for the same given compression force, which is lower than the maximum acceptable force, the shock absorber, according to the invention, will react with a compression speed and displacement speed of the cylinder rod that are different over a range of speeds that is between point D and point C. These characteristics of different compression speeds contribute to the comfort of the suspension, i.e., to the adherence of the tire to the ground, which makes it possible to impart greater mobility to the vehicle. The compression speed zone that lies between points D' and C on curve (8) is in fact compression speeds for which the traditional rubber stop will come into play and in which the vehicle is subjected to the bounce phenomenon that was mentioned at the beginning of the description. Likewise, the possibilities for points A and B to be shifted by low-speed (34) and high-speed (35) adjusting screws also make it possible to better adapt the response curve of the shock absorber according to the invention regardless of the type of terrain that is encountered. This is not the case with the invention of U.S. Pat. No. 4,958,706; it is possible to choose, by adjusting the screw, to adapt the response curve in such a way that the latter corresponds to profile D' so that at low speeds, the vehicle has the response characteristic that is close to curve (340) of the invention and, in this case, it is seen that at moderate speeds that correspond to curve (350), the response of a shock absorber that is adjusted according to the curve that ends at point D' will be considerably poorer and the vehicle will reach the elastic stop very quickly. The other possibility is to choose to make an intermediate adjustment that is depicted by curve (7) that ends at point D and intersects curve (350) at point E. In this case, the response of the shock absorber will be a little better for moderate compression speeds, but the response of the shock absorber will be poorer at low speeds. Thus, if the path comprises notched sheet metal, the comfort of the vehicle and its mobility will be considerably poorer on the notched sheet metal for a displacement speed that is not very high. In fact, part of curve (340) corresponds to displacements of low amplitude, whereas part (350, 3640) corresponds to displacements of large amplitude for generating the vehicle at the edge of, for example, a pothole.

By manipulating the adjustment of high-speed screw (351) and brake spindle (361), it is thus understood that this makes it possible to define a shock absorber whose operation will create a hydraulic brake by replacing elastic stops and whose operation for low speeds will not be affected by said hydraulic brake characteristic.

Other modifications within the grasp of one skilled in the art will also be part of the spirit of the invention.

What is claimed is:

1. An oil shock absorber system for a vehicle comprising:
   a cylinder;
   a piston in said cylinder for driving oil between said piston and a bottom of said cylinder toward a reservoir, said reservoir having a deformable reserve chamber for receiving the oil and a pressurized chamber for deforming the chamber, said reservoir having an intermediate chamber and at least three different orifices wherein a flow path for the oil extends through said intermediate chamber and said orifices into said reserve chamber, one of said orifices being blocked by a first adjustable non-return valve constituting an adjustable hydraulic brake enabling the oil to evacuate said intermediate chamber into the reserve chamber only when pressure exerted by said piston on said oil exceeds a predetermined pressure, and a second adjustable non-return valve blocking a second orifice of said three orifices and disposed between said intermediate chamber and said reserve chamber, said second adjustable non-return valve being adjustable for a range of piston displacement speeds that lies between a first low speed and hydraulic brake speeds.

2. An oil shock absorber system according to claim 1 including a third orifice comprising an adjustable constriction enabling the oil to evacuate from the intermediate chamber to the reserve chamber at low speeds.

3. An oil shock absorber system according to claim 1 wherein the first and second adjustable non-return valves each comprise a screw element having a rod extending therefrom and over a given height having a notched portion about a periphery thereof, a holding cap carried by said rod, a sealing washer and elastic means maintained between said holding cap and said notched portion, said elastic means biasing respective sealing washers against the seats of orifices associated with respective adjustable non-return valves.

4. An oil shock absorber system according to claim 2 including a ball engageable with the notched portion and an elastic means for biasing the ball into the notched portion.

5. An oil shock absorber system according to claim 1 including a cylindrical ring in part defining said intermediate chamber and having an annular groove, said ring closing an open end of the reserve chamber of the reservoir and said intermediate chamber, said cylindrical ring having holes extending through said ring and said annular groove, said holes being threaded for receiving screw elements accessible externally of said reservoir and seals between said screw elements and said holes.

6. An oil shock absorber system according to claim 3 wherein said elastic means comprises a stack of Belleville washers mounted at least 2×2 opposite one another.

7. An oil shock absorber system according to claim 6 wherein the elastic means for said second non-return valve comprises a stack of Belleville washers having a thickness of between 0.20 mm and 0.45 mm.

8. An oil shock absorber system according to claim 6 wherein the elastic means for said first non-return valve comprises a stack of Belleville washers with a thickness of between 0.45 mm and 1 mm, the Belleville washers for said first non-return valve having a thickness greater than the thickness of the washers of the second non-return valve.

* * * * *